Figure 1:
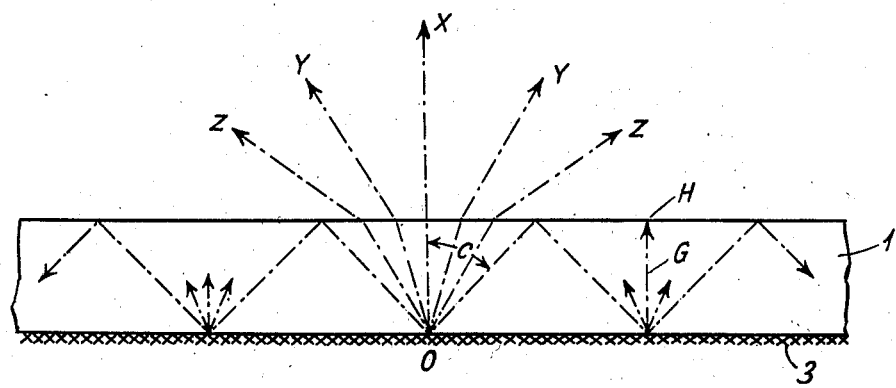

May 6, 1941.   R. R. LAW   2,240,706.
LUMINESCENT SCREEN
Filed Dec. 31, 1937

INVENTOR
RUSSELL R. LAW
BY
ATTORNEY

Patented May 6, 1941

2,240,706

UNITED STATES PATENT OFFICE 2,240,706

LUMINESCENT SCREEN

Russell R. Law, West Orange, N. J., assignor to Radio Corporation of America, a corporation of Delaware Application December 31, 1937, Serial No. 182,702

11 Claims. (Cl. 250—80)

This invention relates to luminescent screens and, in particular, method and means for improving contrast ratio of luminescent screens which are subjected to radiant energy, as for example, electronic bombardment, such as used in television systems.

The use of cathode ray tubes with luminescent screens in television receivers affords one of the most promising methods of reproducing pictures of high quality. High quality pictures require high definition which definition is proportional to the sharpness of outline, and in turn, sharpness of outline is influenced by contrast between adjacent picture elemental areas. Furthermore, good half-tone reproduction requires a long scale of half-tone values which can only be obtained by an adequate contrast range. It will thus be noted that there are two important requirements for high definition reproductions of images by cathode ray tubes. The first is that the contrast between adjacent elemental areas should be high to give high definition, since this factor determines the sharpness of the image, while the overall contrast range must be high in order to reproduce a full scale of half-tone values.

The contrast range and sharpness of outline of a picture reproduced on a kinescope or television cathode ray receiving tube is limited by the deleterious factors of halation, curvature of the luminescent screen, bulb wall reflections, room illumination and stray electrons. Of these factors, halation produces the greatest decrease in contrast range and sharpness of outline, while bulb wall reflection and reflections near normal incident are the second most deleterious effect. In tubes of approved design, the curvature of the screen has the smallest effect in decreasing the effective contrast range obtainable in reproduced pictures. Accordingly, it is the main object of this invention to reduce the halation effect in luminescent screens to improve the contrast range and sharpness of outline in the reproduced picture. The luminescent screen is, in general, produced by depositing in methods well known in the art, finely divided luminescent material directly upon the glass viewing wall of the cathode ray tube. Alternatively, a layer of binder material is first deposited upon the glass wall and finely divided luminescent material affixed to the binder. In some screens the luminescent material is mixed with the binder prior to the depositing of the binder upon the glass end wall of the tube. In accordance with one form of the invention, an improved luminescent screen is provided, which luminescent screen makes use of a neutral light absorbing medium dispersed in a binder which is deposited upon the glass wall of the tube and upon which binder the luminescent material is deposited. In a second form, improvement in contrast range is obtained by exercising such control in the deposition of the luminescent particles upon the binder to control the degree of optical contact between the particles and the binder. The degree of optical contact is such that the particles are embedded only to the degree necessary to prevent them from being dislodged under mechanical impact. This is carried to such a point that only 20% or less of the area of the luminescent particles is actually embedded in the luminescent screen. Further, in accordance with the invention, the binder material is chosen from those groups whose index of refraction is less than the index of refraction of the glass end wall upon which the binder is in contact. In some cases, it is desirable that the binder shall have a melting point less than the melting point of the glass supporting wall. Further, a combination of these methods and means may be used to provide an improved surface. As for example, by using a binder whose index of refraction is less than that of the glass end wall, dispersing neutral light absorbing material through the binder and controlling the degree of optical contact of the luminescent material upon the binder. Such a screen results in a vastly improved contrast range.

Accordingly, it is a further purpose of the invention to provide a luminescent screen comprising a binder in which neutral light absorbing material is dispersed through the binder.

Another object of the invention is to provide a luminescent screen comprising a layer of binder material upon a glass viewing surface and in which the index of refraction of the binder is less than the index of refraction of the glass.

A still further object of the invention is to provide a screen in which luminescent material is deposited upon binder material in such a fashion that only 20% or less of the area of the luminescent material is in contact with the binder material.

A further object of the invention is to provide a luminescent screen in which the optical contact of luminescent material with the binder is only sufficient to prevent the particles from being dislodged mechanically while a suitable neutral light absorbing material is dispersed in the binder and the binder itself has an index of refraction less than the index of refraction of the glass supporting surface.

Likewise, it is an object to use any combination of the three methods and means outlined above to produce an improved luminescent screen.

Figure 2:
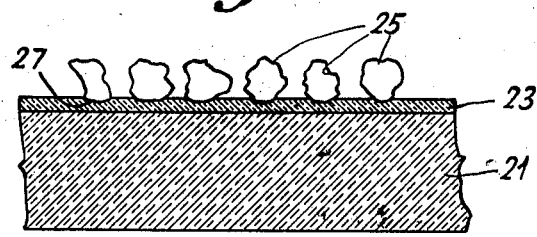
Figure 3:
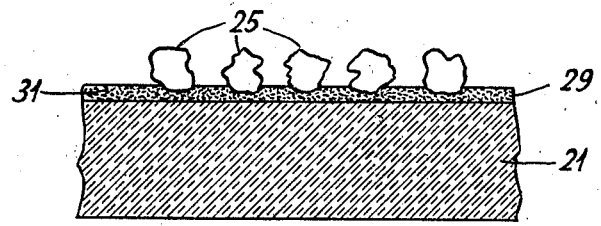

Referring to the drawing in which Fig. 1 shows schematically the origin of halation, Fig. 2 shows in cross-section a screen embodying the invention, while Fig. 3 shows a further embodiment of the invention, I will describe my invention in detail.

Referring to Fig. 1, there is shown in cross-section on a distorted scale, a luminescent screen 3 mounted on a glass wall 1. At the point O, it is assumed that a focused beam of electrons has struck the luminescent material, producing light flux. The light ray Ox which strikes the glass-air inter-face perpendicularly will be undeflected and only a small portion about 4% will be deflected. Rays such as Oy and Oz which strike the face obliquely, will be refracted or bent away from the normal, and a small portion still about 4%, will be reflected. As the angle of incidence is increased, the transmitted ray is bent more and more away from the normal, and somewhat more than 4% of the light will be reflected. How-ever, when the angle of incidence is equal to or greater than the critical angle $i_c$, not just 4%, but the entire amount of the light flux is returned to the fluorescent screen because of the total internal reflection taking place, as is well known in the field of optics. For this reason, a bright spot will be surrounded by a dark circular area and a concentric circle of illumination whose brightness decreases with radial distance. Since the inner glass surface is not entirely in optical contact with the luminescent screens or particles, all of the light flux is not scattered on its first return to the screen and a portion of it will be again totally reflected, giving rise to successive internal reflections. Because of this, the bright spot due to the light at O is usually surrounded by not one but a series of concentric circles of illumination of diminishing brightness. This illumination around the spot is very important in determining the contrast range, as well as affecting the sharpness of the reproduced image. By decreasing the area of optical contact, between the luminescent material and the glass tube face, halation is decreased. This comes about due to the fact that only those light rays which enter the glass tube face through areas of optical contact are susceptible to total internal reflections so that by decreasing the area of contact, the total amount of light flux undergoing internal reflection is reduced. To obtain this low degree of optical contact, a very thin layer of a suitable transparent binder is deposited on the glass end wall and settling the particles of luminescent material upon its surface in such a way that the particles do not become completely imbedded in the film, or alternatively, the particles may be chosen to have effective diameters which are large compared to the thickness of the layer of the binder material so that even though the particles penetrate the binder to reach the glass binder inter-face, nevertheless, the area of the luminescent material in contact with the binder will be 20% or less. Screens built in accordance with the teaching of the prior art are such that from 50-90% of the area of the luminescent particles are in contact with the binder on the glass end wall of the tube.

Referring to Fig. 2 in practicing the invention, the screen may be formed as follows:

A water solution of the desired binder is applied uniformly as a film 23 to the glass surface 21 in a very thin layer upon the order of 10 microns thickness, for example. The binder is then dried with an air-stream while the screen is heated gently until the surface is tacky. The particles of the luminescent material 25 are then gently settled onto the tacky surface of the binder. By carefully controlling the concentration of the binder solution and the amount of drying that occurs before the luminescent particles are settled on its surface, it is possible to control the degree of optical contact 27 between the luminescent material and the binder so that only 20% less of the area of the particles are in contact with the binder.

In the prior art, the luminescent materials were either mixed with the binder and sprayed onto the glass surface as a mixture or immediately upon spraying the binder on the glass surface, the luminescent particles were deposited thereon without the preliminary stages of first drying by air-stream and gentle heat, the binder. Thus the area of particles in contact with the binder ran from 50-90% and produced far more halation than screens produced in accordance with this invention.

As a further step of reducing halation in accordance with the invention, a small amount of neutral light absorbing material is added to the binder before depositing the binder on the glass surface. By "neutral light absorbing material" is meant a material which absorbs light uniformly throughout the visible spectral range so that light transmitted through the binder does not change in its color value due to the transmission. A small amount of neutral light absorbing material dispersed in the binder has very little effect on the light rays passing through perpendicularly, but it does attenuate very rapidly the oblique rays which give rise to the total internal reflections at the binder glass inter-face. Suitable materials for this purpose may be finely divided carbon, graphite or manganese dioxide and the amount of neutral light absorbing material will be on the order of 15% of the binder.

In one such screen prepared in accordance with this method of reducing halation, the thickness of the binder was 10 microns and a transmission of 95% in the normal direction was measured, while at a distance of 1 millimeter along the binder glass inter-face the transmission was only 0.6% transmission. This illustrates clearly the very rapid attenuation which takes place when the oblique rays must pass through a screen in which there is dispersed a neutral light absorbing material. The reason for this is that the light transmitted perpendicular to the surface only traverses a path 10 microns long while totally reflected light at a distance of one millimeter away has travelled a path which is approximately 140 times as great. Since the attenuation increases exponentially as is well known in the art, a very low value is rapidly obtainable even though the attenuation constant itself is low.

Shown in Figure 3 is a cross-section area on a distorted scale, showing the glass surface 21 upon which is placed the thin film of binder 29 through which is dispersed the neutral light absorbing material 31. The exposed surface of the film has deposited thereon the luminescent material 25. It will be understood, of course, that it is desirable to deposit the luminescent material 25 on the film 29 in a similar fashion to that described above in connection with Fig. 2 so that the area of the luminescent material in contact with the film shall be 20% or less. The combination of small optical contact and light absorbing material reduces the halation to a very small amount. In further accord with the invention, the film 23 or 29 in Figs. 2 and 3 respectively, may be made of a material whose index of refraction is less than that of the glass wall. One such material which may be used, for example, is boron trioxide whose index of refraction is 1.464, while the glass such as is commonly used in cathode bulbs may be "Nonex" produced by the Corning Glass Works which has an index of refraction of 1.487. The softening point of the Nonex glass is of the order of 760 degrees, while boron trioxide has a melting point on the order of 575 degrees. In preparing the screen, therefore, a somewhat different method is used than above described where a water soluble binder was used. Where a screen of the type of boron trioxide is used the procedure is as follows:

A thin layer of finely powdered boron trioxide is uniformly distributed over the end wall of the glass surface. The end wall is heated in such a fashion as not to introduce strains, i. e. with slow rates of increase in temperature, up until the time the boron trioxide becomes molten, and forms a substantially continuous layer of molten material. The particles of the luminescent material which may be, for example, willemite, or any other suitable luminescent material, are settled upon the molten surface just prior to the solidification thereof, due to the high viscosity on the molten material and the light weight of the particles, the particles are unable to settle to a very great depth before solidification takes place, and hence, the particles have only a very small portion of their area in contact with the boron trioxide.

It is evident that the use of such a screen is very desirable in eliminating halation which would otherwise take place at the binder-glass interface. A further important improvement is possible in accordance with the invention, by dispersing through the binder, neutral light absorbing material. In the absence of the neutral light absorbing material in the binder, at the glass-air interface, total internal reflection takes place and the totally reflected light is transmitted through the glass and binder. At the binder-air interface total internal reflection again takes place and this reflected light is transmitted through the binder and glass to the air to give rise to halation. By adding the light absorbing material to the binder, the light totally reflected at the glass-air and binder-air interfaces are greatly attenuated so that further reduction of halation with consequent improvement in image reproduction is accomplished. By binder-air interface is meant the interface between the binder and the tube atmosphere, whether the atmosphere be high vacuum, gas or other media.

To obtain the optimum effects of reduced halation without undue sacrifice in efficiency the optical contacts should be 20% or less, while the neutral light absorbing material may be increased to a point giving a range of 10 to 20% attenuation of the light to the observer.

In accordance with the invention, finely powdered boron trioxide is mixed with finely divided neutral light absorbing material prior to the settling of the material upon the glass end wall. From then on, the steps are substantially those as indicated above.

A screen prepared in this fashion has minimum halation since the effect of total reflection at the binder-glass interface is done away with, while the diffusion of light which takes place at the point of impact of the electronic beam, for example, with a luminescent material is absorbed by the neutral light absorbing material in a similar fashion to the totally reflected light in screens where the binder material has an index of refraction greater than that of glass.

Having described my invention, what I claim is:

1. In the manufacture of a luminescent screen provided with a layer of binding material, the method of rendering the screen substantially free from halation which includes the steps of settling particles of luminescent material upon the layer of binder material, and controlling the settling to restrict the area of the particles in contact with the layer to less than 20%.

2. The method of making a non-halation luminescent screen having a glass support surface which comprises the steps of producing a layer of binding material having an index of refraction less than the index of refraction of the glass surface, dispersing neutral light absorbing material through the layer of the binding material, settling particles of luminescent material upon the layer of binding material, and controlling the settling of the particles of luminescent material so that not more than 20% of the area of the particles are in contact with the layer.

3. A non-halation luminescent screen comprising a glass support surface, a layer of binding material, and particles of luminescent material imbedded in the binding material only to the extent of 20% of the area of said particles.

4. A non-halation luminescent screen comprising a glass support surface, a layer of binding material, neutral light absorbing material dispersed through the binding material, and particles of luminescent material imbedded in the binding material only to the extent of 20% of the area of said particles.

5. The process of preparing a luminescent screen having reduced halation which includes the steps of forming a layer of transparent binding material upon a glass surface having a predetermined index of refraction, said binding material having an index of refraction less than the predetermined index of refraction of the glass, settling particles of luminescent material upon said layer, controlling the settling to restrict the area of the particles in contact with said layer to substantially 20% of the total area of the particles, and drying said layer to substantially permanently affix the particles thereto.

6. The method of preparing an halation free viewing screen which comprises the steps of depositing a substantially transparent layer of binding material upon a substantially transparent support base, said binding material having an index of refraction less than that of the support base and a melting temperature less than that of the support base, heating the base member and the binding material to a temperature such that the binding material becomes substantially liquid in form, cooling and then drying the binding material until it is in a viscous state, and then depositing particles of luminescent material upon the viscous binding material layer so that only a minor percentage of the surface area of the luminescent material particles is in contact with the binder material.

7. The method of forming luminescent coatings upon a vitreous surface having a predetermined index of refraction which comprises the steps of mixing a binder material having an index of refraction less than that of the vitreous surface with substantially non-color selective light absorbing material, the percentage of non-color selective light absorbing material being less than 15% by volume of the binder material, depositing the mixture upon the vitreous surface, heating the mixture until it becomes substantially of liquid form, then cooling and solidifying the mixture until it is in a viscous state, and depositing particles of luminescent material upon the binder material while said material is in said viscous state.

8. The process of preparing a luminescent screen upon a transparent vitreous support member having a predetermined index of refraction which includes the steps of depositing a layer of substantially transparent binder material upon the said support surface, the index of refraction of the binding material being less than that of the support member, dispersing a substantially non-color selective light absorbing material throughout the layer of binding material so that the said material is approximately 15% of the combined mass, and then affixing luminescent material particles to said layer of binding material and non-color selective material.

9. The process of preparing a luminescent screen upon a transparent vitreous support member which includes the steps of depositing a layer of substantially transparent binder material upon the said support surface, interspersing a substantially non-color selective light absorbing material thoughout the layer of binding material and then substantially permanently affixing luminescent material particles substantially to the surface area of said binder material layer.

10. A screen structure comprising a glass supporting base member having a predetermined index of refraction, a binder material having admixed therewith a substantially non-color selective light absorbing material, said binding material being supported by the said glass support surface, and a layer of luminescent material particles supported upon and substantially permanently affixed to the surface of said binding material remote from the glass support surface, said binder material having an index of refraction less than that of the glass support member.

11. A screen structure comprising a substantially transparent supporting base member having a predetermined index of refraction and a predetermined melting point, a substantially transparent binder material having admixed therewith a substantially non-color selective light absorbing material, said binding material having a lesser index of refraction and a lower melting point than the support base, said material being supported upon the said support surface, and a coating of luminescent material particles upon and substantially permanently affixed to the surface of said binding material remote from the support surface.

RUSSELL R. LAW.